Aug. 4, 1942.    G. S. SCHMIDT    2,292,162
ANTISKID CHAIN LINK
Filed March 30, 1940

INVENTOR
GEORGE SMALL SCHMIDT
BY
ATTORNEY

Patented Aug. 4, 1942

2,292,162

UNITED STATES PATENT OFFICE 2,292,162

ANTISKID CHAIN LINK

George Small Schmidt, York, Pa., assignor to American Chain & Cable Company, Inc., New York, N. Y., a corporation of New York Application March 30, 1940, Serial No. 326,840

5 Claims. (Cl. 152—243)

This invention relates to improvements in antiskid chain links.

One of the objects of this invention is the provision of an improved link for use in anti-skid chains of the type consisting of a plurality of double-ended members crossing each other and welded together to provide projecting ends constituting anti-skid devices.

A more specific object of this invention is the provision of a link consisting of two substantially identical generally V-shaped members having their legs crossing each other near their free ends at a point midway between the ends of the link and having their apices constituting connecting loops for connecting the links to form a chain.

It is a further object of this invention to twist the apices of the V's constituting the links in opposite directions with respect to each other in their assembled relation for interconnection in forming a chain.

Further objects of this invention will appear from the following description taken in connection with the drawing, in which—

Figure 1:
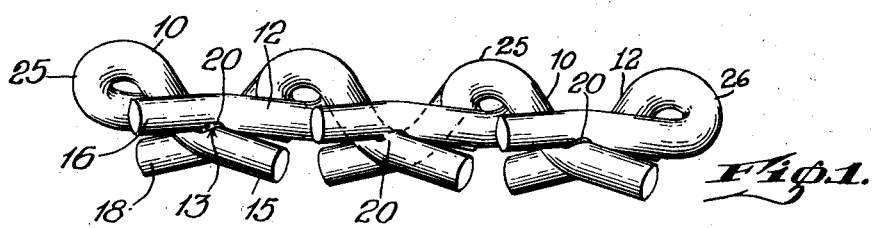
Fig. 1 is a side elevational view of a chain section comprising three links constructed in accordance with this invention.
Figure 2:
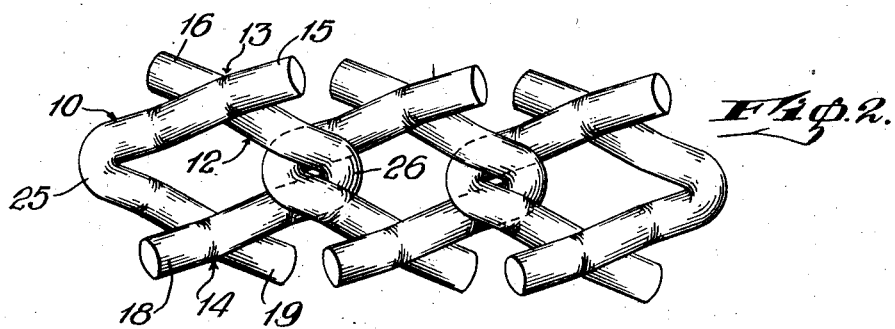
Fig. 2 is a bottom plan view of the chain section shown in Fig. 1.
Figure 3:
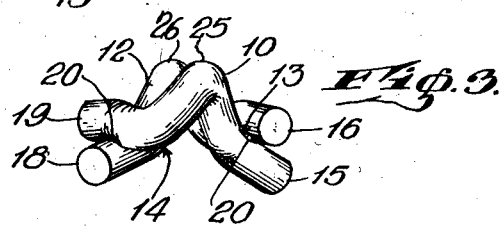
Fig. 3 is an end view of the left hand end link disclosed in Fig. 1.

Referring first to Figs. 1, 2, and 3, the link shown therein consists of two generally V-shaped members 10 and 12 which may be of identical construction as disclosed and which have their legs crossing each other centrally of the length of the link as indicated at 13 and 14. The leg 15 of the member 10 may cross the leg 16 of the member 12 on the roadside thereof and the leg 18 of the member 12 may cross the leg 19 of the member 10 at the roadside thereof, the legs being secured together by welding as indicated at 20 Fig. 1. The apex 25 of the member 10 and the apex 26 of the member 12 are preferably twisted in opposite directions and in the directions indicated on the drawing so that the links may lie flat when interconnected to form a chain.

As disclosed the end of the leg 15 of the member 10 and the end of the leg 18 of the member 12 constitute primary anti-skidding devices which project generally diagonally of the link, downwardly below the main body of the link to dig into ice or the like on the road and laterally beyond the sides of the link to render the link more stable, and in opposite directions to produce counterbalancing effects.

The ends of the legs 16 and 19 of the members 12 and 10 extend in opposite diagonal directions respectively with respect to the ends of the legs 15 and 18 and operate to counter-balance the effect of the ends of the legs 15 and 18 in cases where the ends of the legs 16 and 19 are also pressed into the ice or the like on the road.

As is apparent from Fig. 1, in the normal operation of the chain at low speeds on hard ice, for example, the ends of the legs 15 and 18 are effective while the ends 16 and 19 are ineffective but if the chain is rotated under heavy tractional forces in a counter-clockwise direction as viewed from the right of Fig. 1 then the end of the leg 16 will also be moved into contact with and pressed into the road. The ends of the legs 18 and 19 will be rotated against the surface of the tire and will cause a greater portion of the weight of the automobile to be placed on the ends of the legs 15 and 16.

It is also clear from the disclosure in Fig. 1 that the ends of the legs 16 and 19 which are normally ineffective as anti-skid devices are substantially in contact with the tire in service and form a wide bearing for the link on the tire, thus resisting the tendency of the links to rotate. This link provides a very stable construction and very effective counter-balance anti-skid effects.

Figure 4:
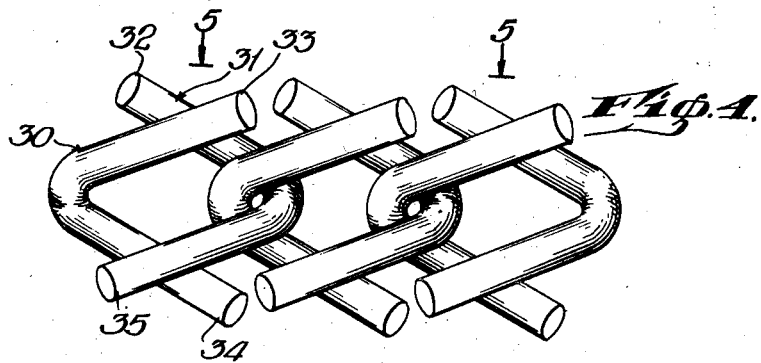
Fig. 4 shows a slightly different modified form of link.
Figure 5:
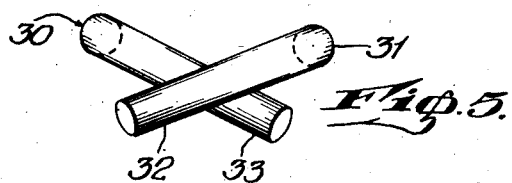
Fig. 5 is a side view of the modified form of link taken on the line 5—5 of Fig. 4.

As disclosed in Figs. 4 and 5, the link may consist of two identical generally V-shaped members 30 and 31 and the legs and apex of each member may be arranged in the same plane. The legs may cross each other and be welded together to provide anti-skid projections 32, 33, 34, and 35 all of which may be normally effective as indicated in Fig. 5.

It is obvious that the members of which the link is constructed may vary from the pointed apex V-form disclosed and may be of a general U-form or the like and the legs may be parallel instead of divergent as to certain of its functions so long as the legs or the ends of the legs extend in directions to cross each other at the center of the link and be welded together to produce projecting anti-skid devices extending generally as indicated. It is also obvious that one of the members may be narrower than the other so that the legs of the former may be located between and welded to the legs of the other. The expression V-shaped is therefore intended to cover equivalent forms such as U-shaped forms unless otherwise limited by the language of the claims.

Considering the link as a unitary construction, it may be described as having the median portions of its side strands located below the lowermost portions of its end connecting loops and each strand as being provided with downwardly diverging anti-skid devices or caulks with reference to a transverse plane through the median portions of the side strands and normal to the plane of the road, and with downwardly and outwardly extending anti-skid devices with reference to a plane through the longitudinal axis of the link and normal to the road. The arrangement of and the direction in which the caulks extend are such that at least one of the caulks will be inclined in a direction to effectively dig into the ice on the road regardless of the direction in which there may be a tendency to skid or slide.

While I have disclosed but two embodiments of my invention, it is to be understood that I reserve the right to all such changes as fall within the principles of my invention and the scope of the appended claims.

I claim:

1. A link consisting of a pair of generally V-shaped members having their apices facing in opposite directions away from each other, and each member having its legs crossing and projecting beyond the legs of the other member and welded thereto centrally of the length of the link to constitute the side strands of the link, the projecting portions of the legs constituting the anti-skid devices and the apices constituting the end loop connecting portions of the link.

2. A link consisting of a pair of generally V-shaped members having their apices facing in opposite directions away from each other, and each member having its legs crossing and projecting beyond the legs of the other member and welded thereto to constitute the side strands of the link, the projecting portions of the legs constituting anti-skid devices and the apices constituting the end loop connecting portions of the link, the legs crossing centrally of the length of the link and at a point below the apices.

3. A link consisting of a pair of generally V-shaped members having their apices facing in opposite directions away from each other, and each member having its legs crossing and projecting beyond the legs of the other member and welded thereto to constitute the side strands of the link, the projecting portions of the legs constituting anti-skid devices and the apices constituting the end loop connecting portions of the link, the legs crossing centrally of the length of the link and at a point below the apices, the apices being twisted out of the plane of the legs for connection with similar links to form a chain.

4. A link comprising end loop connecting portions and side strands and a pair of anti-skid projections connected to each side strand centrally of its length and projecting downwardly and diverging with respect to each other as viewed from a side of the link, said pairs of projections projecting downwardly and diverging relatively as viewed from an end of the link.

5. A link comprising end loop connecting portions and side strands and a pair of anti-skid projections connected to each side strand centrally of its length and projecting downwardly and diverging as viewed from a side of the link.

GEORGE SMALL SCHMIDT.